United States Patent [19]
Pellegrino

[11] Patent Number: 5,171,122
[45] Date of Patent: Dec. 15, 1992

[54] DEVICE FOR LOADING AND UNLOADING MOTOR VEHICLES

[75] Inventor: Luigi Pellegrino, Rivalba, Italy
[73] Assignee: Space S.r.L., Italy
[21] Appl. No.: 744,314
[22] Filed: Aug. 13, 1991
[30] Foreign Application Priority Data Mar. 13, 1991 [IT] Italy ............................ 000176 A/91

[51] Int. Cl.⁵ .............................................. B60P 1/38
[52] U.S. Cl. ................................. 414/514; 198/750; 198/814; 414/521
[58] Field of Search ............... 414/509, 510, 513-517, 414/521, 527, 528, 525.1; 198/750, 814

[56] References Cited

U.S. PATENT DOCUMENTS

| | | | |
|---|---|---|---|
| 2,512,339 | 6/1950 | Knapp, Jr. | 414/515 |
| 3,008,565 | 11/1961 | Small | 198/814 X |
| 3,250,408 | 5/1966 | Daniluk et al. | 414/521 X |
| 3,656,638 | 4/1972 | Hutton et al. | 414/515 X |
| 4,082,196 | 4/1978 | Lutz et al. | 414/527 X |
| 4,204,592 | 5/1980 | Lutz et al. | 198/750 |
| 4,249,843 | 2/1981 | Kerr | 414/514 X |
| 4,431,360 | 2/1984 | Maeno | 414/509 X |
| 4,878,635 | 11/1989 | Nordstrom | 414/521 X |

FOREIGN PATENT DOCUMENTS

| | | |
|---|---|---|
| 0240524 | 12/1989 | European Pat. Off. . |
| 3711765 | 10/1988 | Fed. Rep. of Germany ...... 198/814 |
| 34534 | 4/1981 | Japan ................... 414/521 |
| 8701996 | 4/1987 | World Int. Prop. O. .......... 414/521 |

Primary Examiner—David A. Bucci
Attorney, Agent, or Firm—Edward D. Manzo

[57] ABSTRACT

A device for loading and unloading a truck includes a plurality of endless, parallel conveyor cables extending along a load platform of the truck and movable relative thereto with respective upper support passes projecting above the platform, a cross member fixed to the cables for moving them simultaneously, and a drive unit with endless movable chains for moving the cross member along the platform. The drive unit is fitted to the rear end of the platform and includes an electric motor with two outputs and an automatic tensioning device for taking up the slack in the chains.

3 Claims, 6 Drawing Sheets

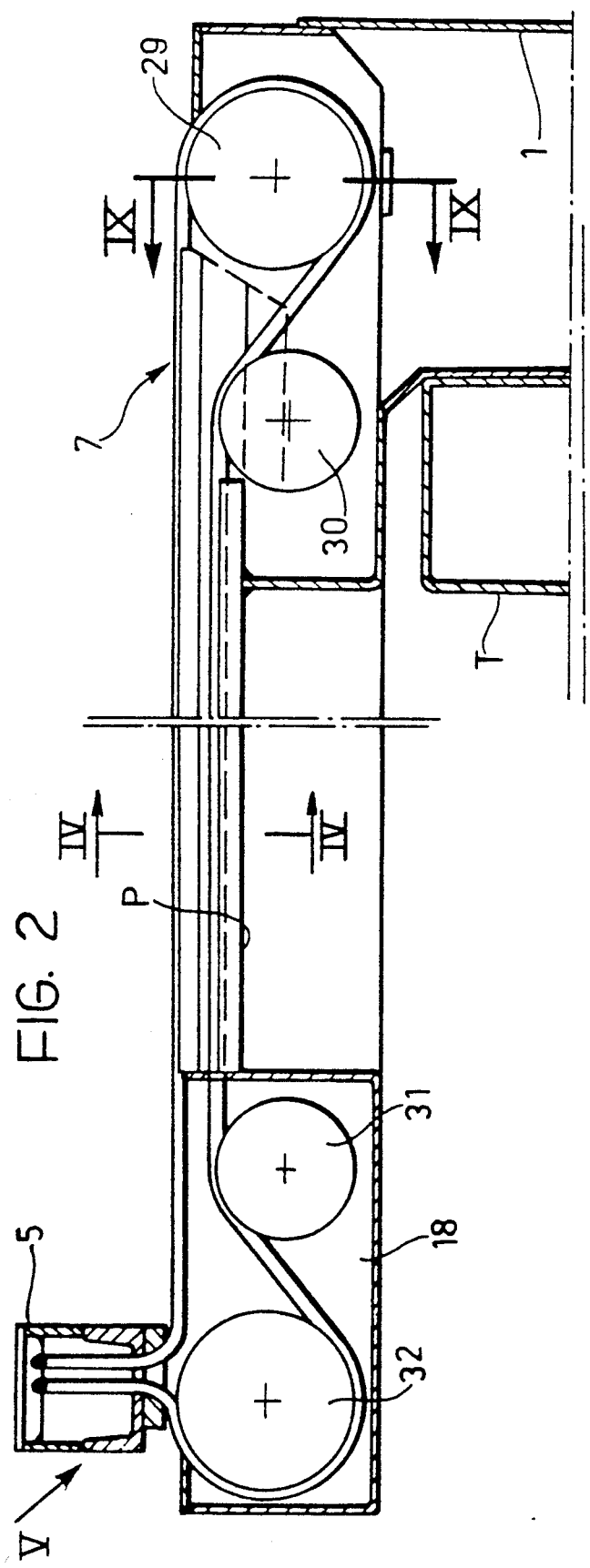
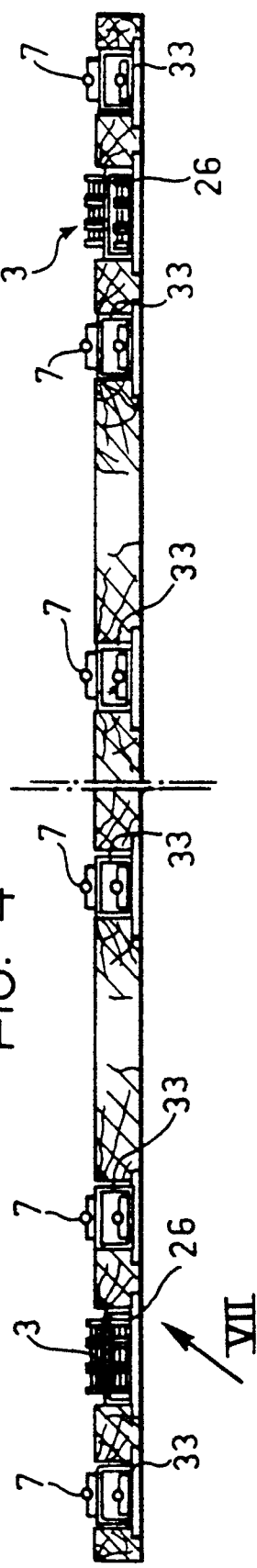
FIG. 2
FIG. 4

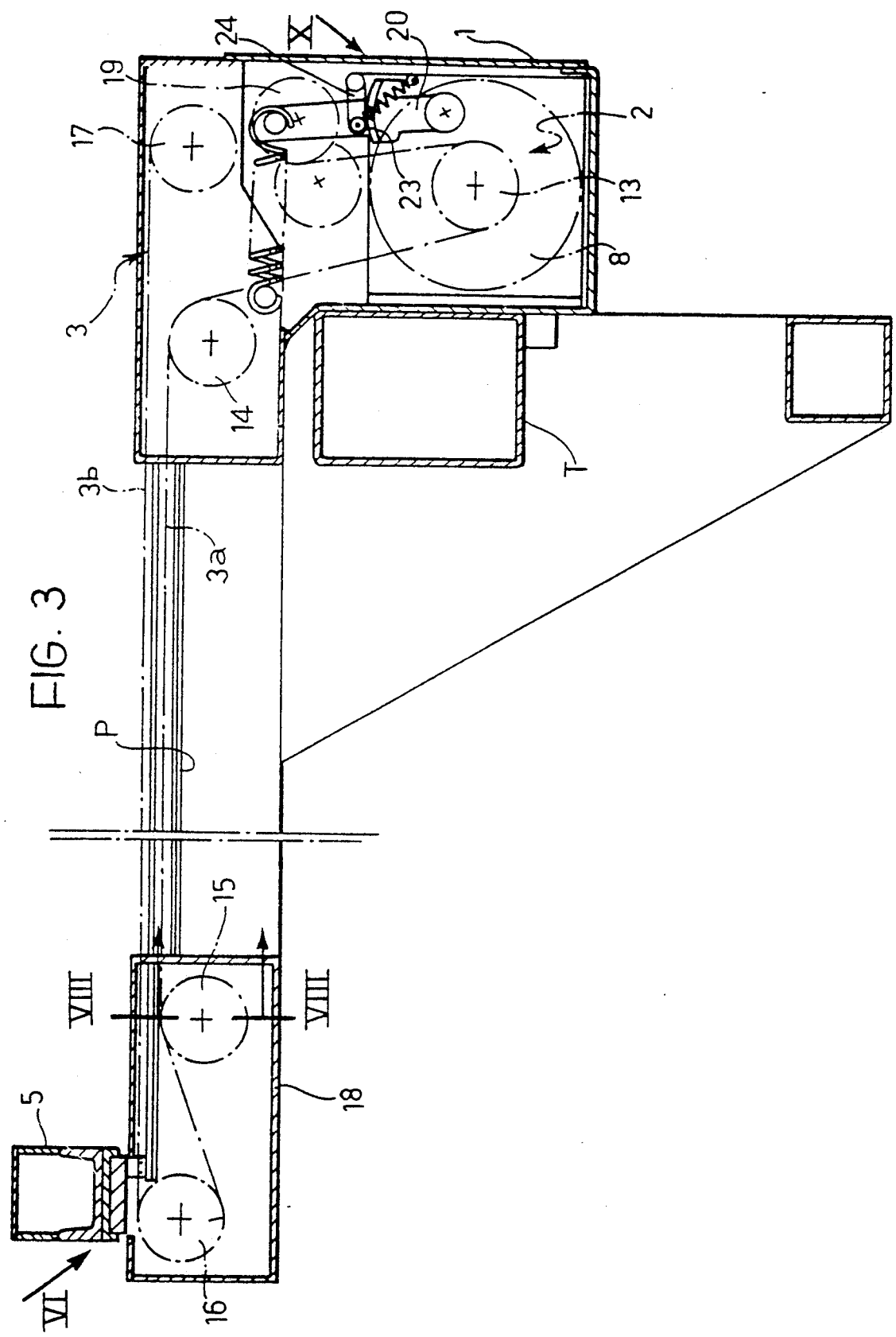

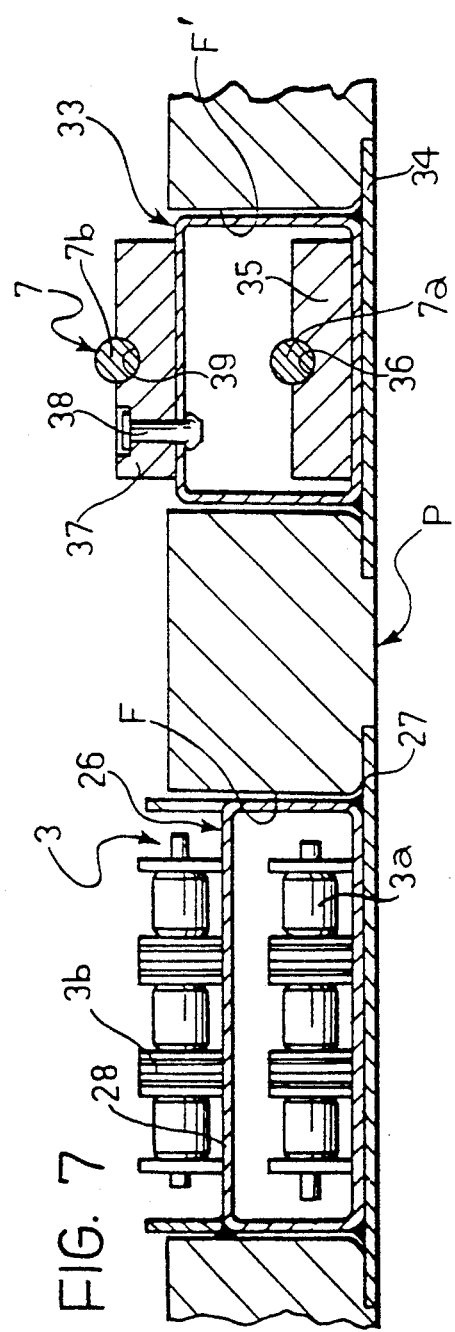
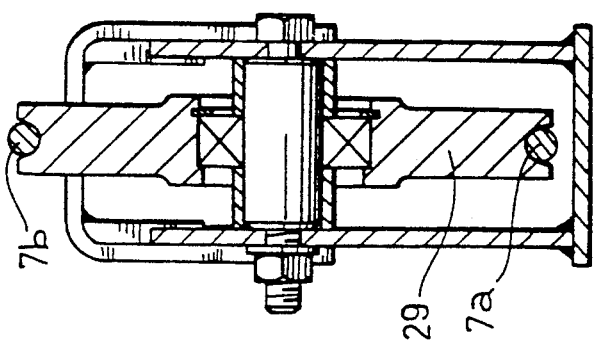
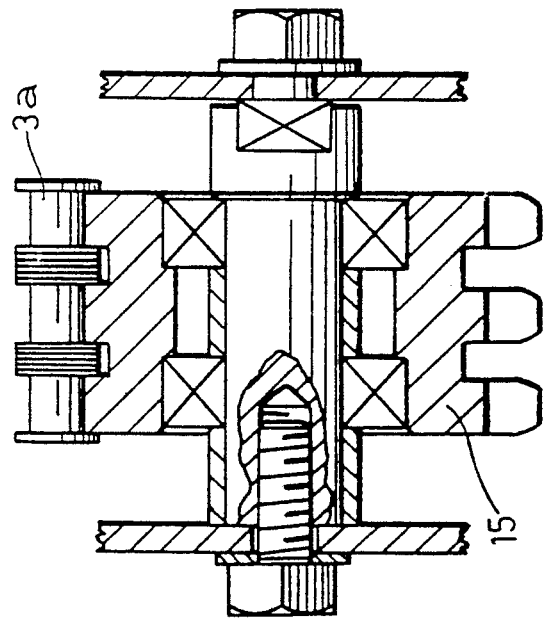

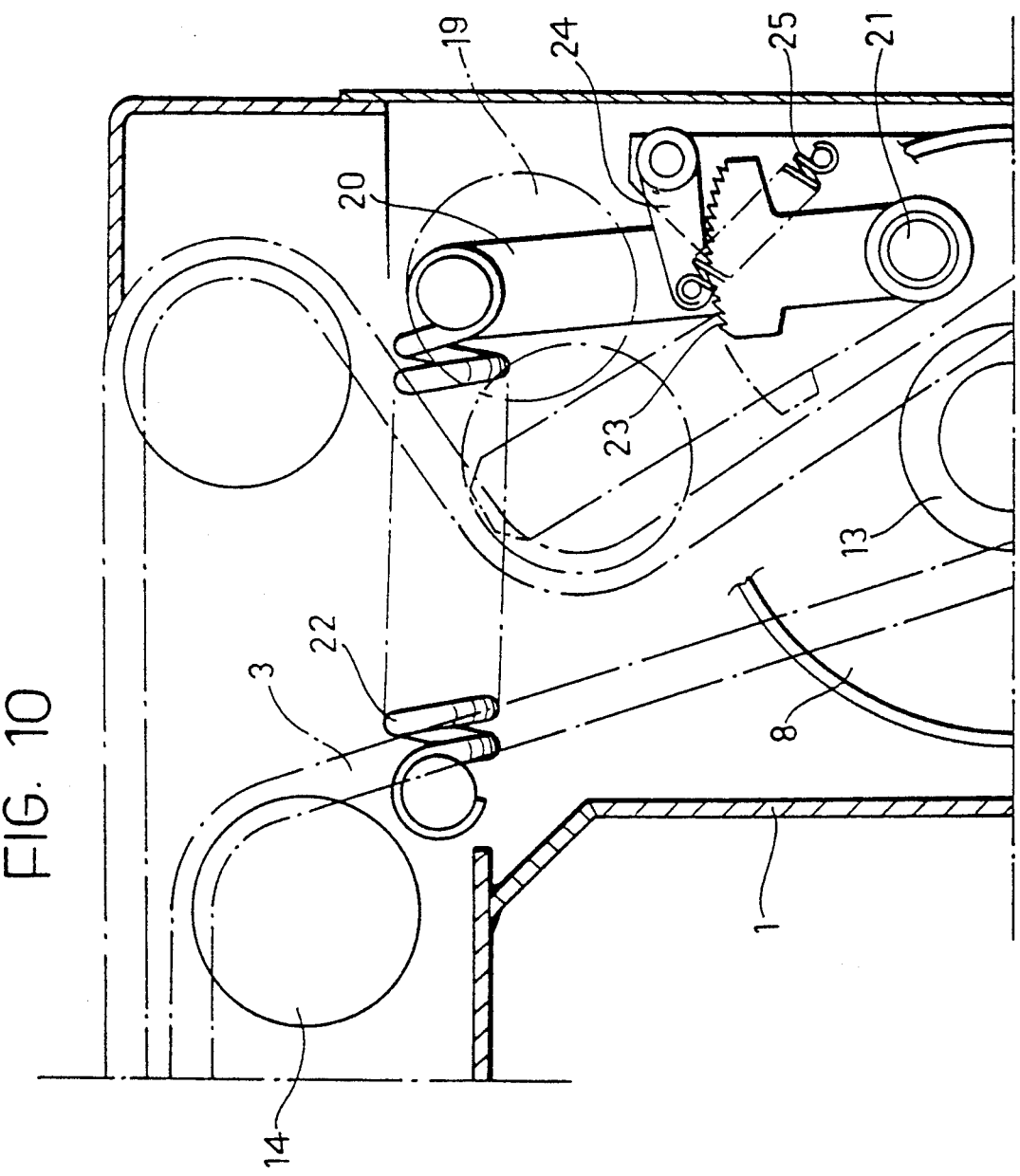

1

DEVICE FOR LOADING AND UNLOADING MOTOR VEHICLES

BACKGROUND OF THE INVENTION

The present invention relates to devices for loading and unloading trucks and similar motor vehicles. More particularly, the invention relates to a device of the type including a plurality of essentially endless, parallel conveyor cables which extend along a load platform of the truck and are movable relative thereto with respective upper conveyor passes projecting above the platform, a movable cross member fixed to the cables for moving them simultaneously, and a drive unit with chains for moving the cross member.

Loading and unloading devices of this type are known, for example, from U.S. Pat. Nos. 4,082,196 and 4,204,592. In these devices, the drive unit is constituted by a pair of hydraulic motors carried by the cross member and driving respective sprockets engaged by respective stationary chains the ends of which are fixed to the platform.

This solution involves a cross member of considerable structural complexity and appreciable size since it has to house the two hydraulic motors with their pumps, hydraulic reservoirs and valve units, and the load space available on the platform is thus reduced. Moreover, maintenance operations in the event of a breakdown of the drive unit may be extremely difficult when there is a load on the platform because of the resulting difficulty of access to the cross member. A further problem lies in the fact that the inevitable extension of the two chains may cause irregular movement or jamming of the cross member due, for example, to its misalignment from its correct position perpendicular to the length of the platform as a result of the differential extension of the two chains.

The object of the present invention is to avoid the aforesaid problems and to provide a loading and unloading device of the type defined above which is simpler and cheaper to produce and safer and more reliable in operation.

SUMMARY OF THE INVENTION

According to the invention, this object is achieved by virtue of the fact that:

the drive unit includes an electric motor with two outputs, a pair of sprockets driven by the two outputs of the electric motor, a pair of endless movable chains which extend adjacent the sides of the platform, pass around the sprockets and are fixed substantially at the ends of the cross member, and an automatic tensioning device for taking up the slack in the chains, the motor, the sprockets and the automatic tensioning device form parts of a stationary unit fitted to one end of the platform, and the upper and lower passes of the cables and of the two chains are guided along respective profiled members fitted in corresponding longitudinal slots in the platform of the truck.

The automatic tensioner preferably comprises, for each chain, a tensioning wheel carried by a pivoting arm which is subject to the action of a thrust spring and is associated with a one-way ratchet unit.

BRIEF DESCRIPTION OF THE DRAWINGS

The invention will now be described in detail with reference to the appended drawings, provided purely by way of non-limiting example, in which:

FIG. 2 is a longitudinal section taken on the line II—II of FIG. 1, FIG. 3 is a longitudinal section taken on the line III—III of FIG. 1, FIG. 4 is a transverse section taken on the line IV—IV of FIG. 2, on an enlarged scale, FIG. 7 shows the detail indicated by the arrow VII in FIG. 4, on an enlarged scale, FIG. 8 is a section taken on the line VIII—VIII of FIG. 3, on an enlarged scale, FIG. 9 is a section taken on the line IX—IX of FIG. 2, on an enlarged scale, and FIG. 10 shows the detail indicated by the arrow X in FIG. 3, on an enlarged scale.

DESCRIPTION OF A PREFERRED EMBODIMENT

Figure 6:
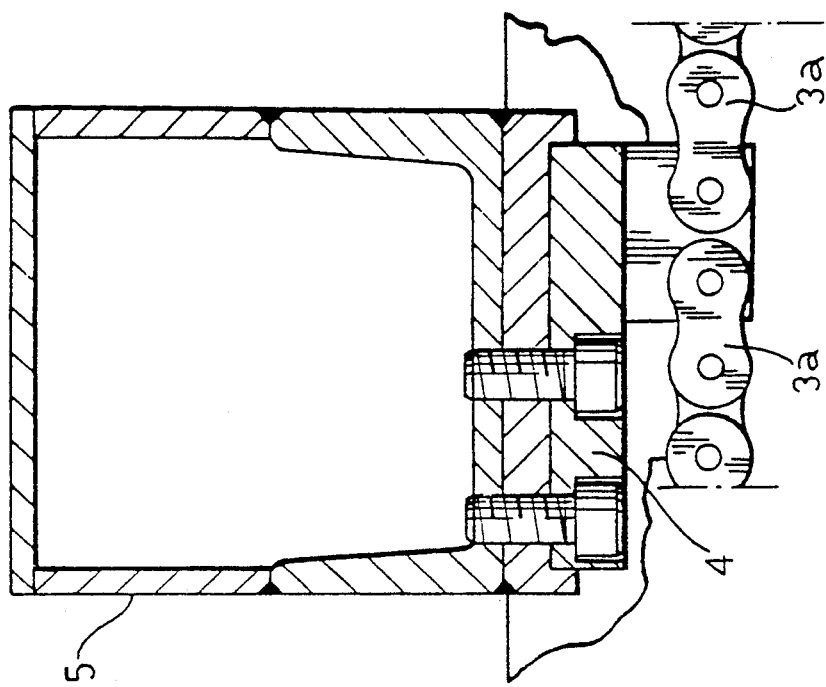
FIG. 6 shows the detail indicated by the arrow VI in FIG. 3, on an enlarged scale.

In the drawings, the loading platform of a truck is indicated P and is supported in conventional manner by a chassis T of the vehicle. A housing 1 is fitted to the rear end of the platform P and houses a drive unit 2 for driving a pair of endless chains 3 which extend longitudinally of the platform P in the manner explained below, adjacent its sides and substantially within its thickness. The two chains 3 are fixed at 4 adjacent the ends of a low, narrow transverse thrust member 5 in the manner shown in greater detail in FIG. 6. The cross member 5 extends perpendicular to the length of the platform P and is movable between the front and rear ends thereof by the movement of the two chains 3.

Figure 5:
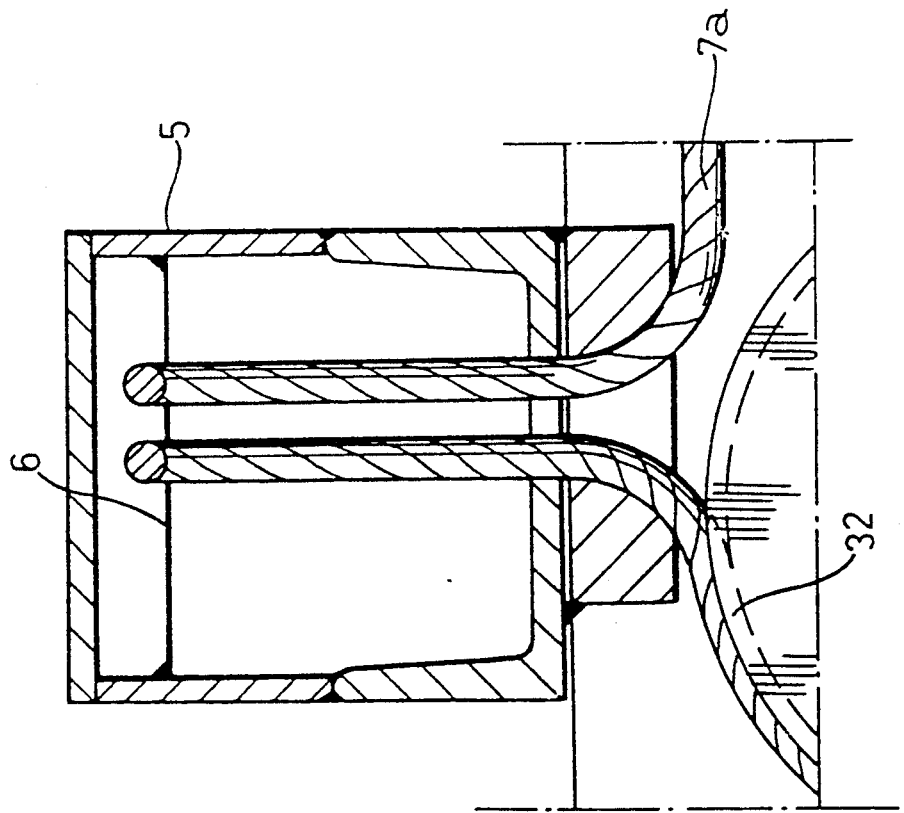
FIG. 5 shows the detail indicated by the arrow V in FIG. 2, on an enlarged scale.

Endless metal cables or ropes 7 fixed to the cross member 5 at 6, in the manner best seen in FIG. 5, also extend longitudinally of the platform P in the manner explained below and are movable relative to the platform P as a result of the movement of the cross member 5.

The drive unit 2 includes a single electric motor 8 with a transverse axis, that is, with its axis parallel to the cross member 5, and two outputs of which one drives a first geared reduction unit 9 directly and the other drives a second geared reduction unit 10 through a transmission shaft 11 and a pair of joints 12. Each of the reduction units 9, 10 transmits the drive to a respective sprocket 13 around which the corresponding chain 3 passes.

Each chain 3 also passes around a first idler sprocket 14 from which its horizontal, lower pass 3a extends along the entire length of the platform P, near the front end of which it passes around a sprocket 15 to a return sprocket 16 from which its horizontal upper pass 3b extends above and parallel to its lower pass 3a. The upper pass 3b then passes around a further return sprocket 17 and completes the loop to the drive sprocket 13. The sprockets 14 and 17, like the drive sprocket 13, are housed in the housing 1, whilst the sprockets 15 and 16 are housed in a second housing 18 fixed to the chassis T of the vehicle near the front end of the platform P.

Between the return sprocket 17 and the drive sprocket 13, each chain 3 is acted upon by a tensioning sprocket 19 which automatically takes up the natural extension of the chain in use. As can be seen in greater detail in FIG. 10, the tensioning sprocket 19 is supported for rotation by a fork 20 which pivots about a transverse shaft 21 between positions shown in continuous outline and broken outline in FIGS. 3 and 10. The fork 20 is subjected to torque by tension springs 22 which urge the tensioning sprocket 19 towards the front end of the platform P against the chain 3, the fork carrying a sector 23 with saw-teeth that cooperate with a one-way ratchet pawl 24 which in turn is subject to the action of a tension spring 25. Clearly, the pawl 24 and the teeth 23 act to restrain the support fork 20, and hence the tensioning sprocket 19, in the angular positions they assume from time to time as a result of the extension of the respective chain 3.

With reference now to FIGS. 4 and 7 in greater detail, the lower pass 3a of each of the two chains 3 is movable in a tubular, quadrangular-sectioned profile 26 fitted in a longitudinal through-slot F in the platform P. The tubular profile 26 has a base plate 27 fixed to the lower face of the platform P and its upper wall 28 acts as a support for the sliding of the upper pass 3b of the chain 3.

Figure 1:
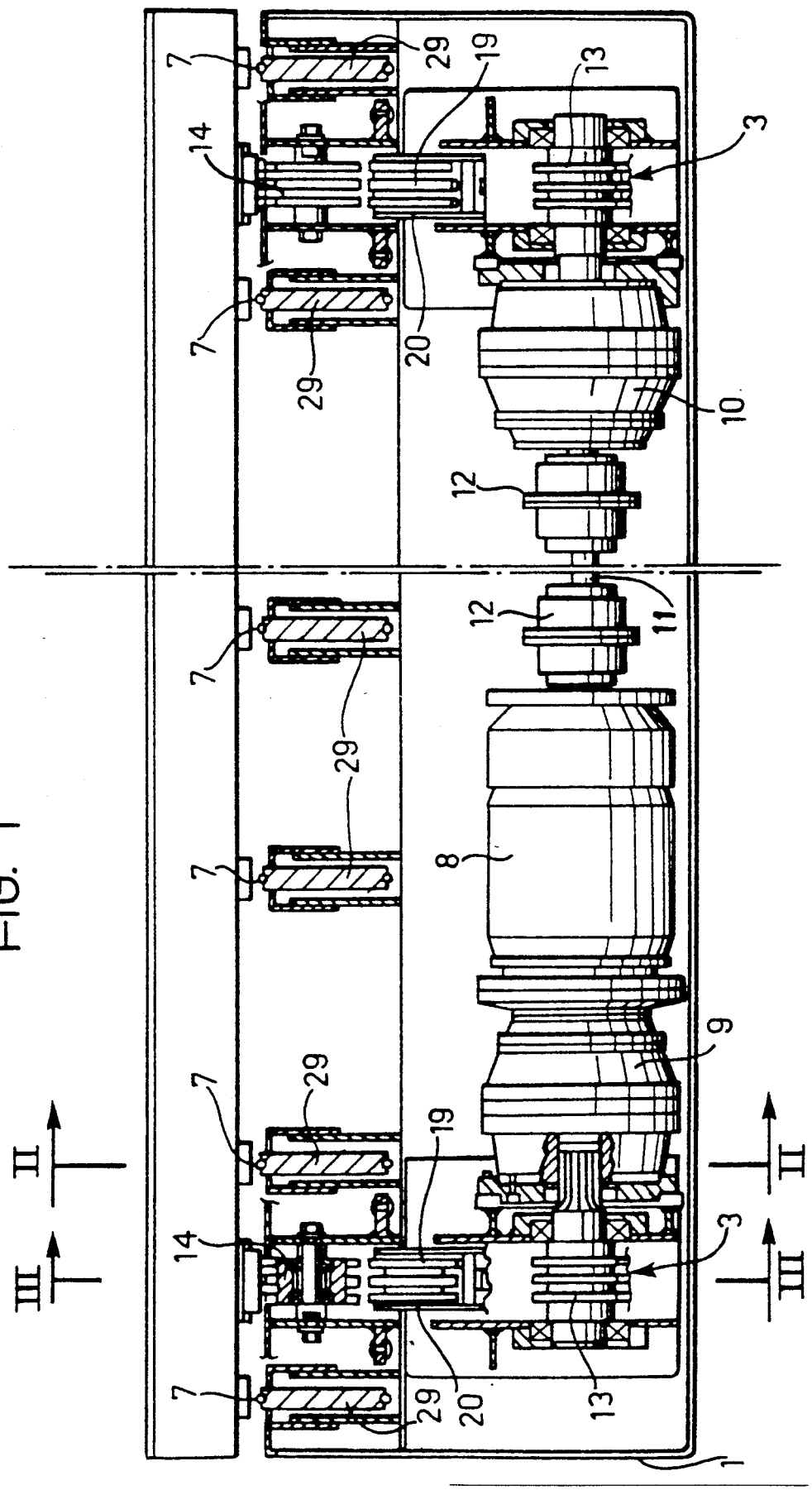
FIG. 1 is a cross-section of the load platform of a truck with a loading and unloading device according to the invention.

As shown in FIGS. 1 and 2, at one end, each cable 7 passes around two grooved wheels or idler pulleys 29, 30 with horizontal axes, from which its lower pass 7a extends longitudinally to the front end of the platform P where it passes around two further idler pulleys 31, 32 from which its upper pass 7b extends parallel to and adjacent its lower pass 7a. As stated above, the upper pass 7b is fixed to the cross member 5 at 6.

With reference again to FIGS. 4 and 7, the lower pass 7a of each cable 7 extends within a tubular quadrangular-sectioned profile 33 fitted in a corresponding longitudinal through-slot F' in the platform P and having a base plate 34 fixed to the lower face of the platform P. A guide 35 of strong plastics material with a low coefficient of friction is fixed in the bottom of the tubular profile 33 and has a semicircular-sectioned groove 36 in which the lower pass 7a of the cable 7 can slide. A similar guide 37 is fixed externally to the top of the section 33 and projects above the upper face of the platform P. The guide 37, which, conveniently, is simply fixed to the upper wall of the tubular element 33 by rivets 38, also has an upper semicircular groove 39 in which the upper pass 7b of the cable 7 can slide. The guides 35 and 37 are normally of the type described and illustrated in the Applicant's European patent EP-C-240524.

With reference again to FIGS. 4 and 7 it can readily be seen that the upper passes 7b of the cables 7 thus extend at a level above the platform P in order to support and move the loads present thereon, whilst the upper passes 3b of the two chains 3 extend at a lower level substantially flush with the upper surface of the platform P. In effect, the function of the chains 3 is solely to transmit the drive from the motor 8 to the cross member 5, which in turn moves the cables 7 for loading and unloading operations.

It is clear from the foregoing that the device according to the invention on the one hand enables the cross member 5 to be considerably smaller and, on the other hand, simplifies the operations needed to install it in a truck, for which it is necessary simply to form the slots F, F' in which the tubular sections 26 and 33 can be fitted and then to fix the housing 1 with the drive unit 2 and the housing 18 with the respective idler sprockets and pulleys in the rear and front regions of the platform P respectively. Moreover, any maintenance of the drive unit 2 is considerably easier since it is in a region of the platform P which is not affected by the load and is thus readily accessible.

Naturally, the details of construction and forms of embodiment may be varied widely with respect to those described and illustrated, without thereby departing from the scope of the present invention.

What is claimed is:

1. A device for loading and unloading a truck having a load platform, including a plurality of essentially endless, parallel conveyor cables extending along the load platform and movable relative thereto, the cables defining respective upper support passes which project above the platform, a movable cross member fixed to the cables for moving them simultaneously, and a drive unit with chains for moving the cross member along the platform, wherein:

the drive unit includes an electric motor with two outputs, a pair of sprockets driven by the two outputs of the electric motor, a pair of endless movable chains which extend adjacent sides of the platform, pass around the sprockets and are fixed substantially at ends of the cross member, and an automatic tensioning device for taking up slack in the chains, the motor, the sprockets and the automatic tensioning device form parts of a stationary unit fitted to one end of the platform, and the platform has longitudinal slots and respective profiled members, along which the upper and lower passes of the cables and of the two chains are guided and are fitted in said slots.

2. A device according to claim 1, wherein the automatic tensioning device comprises, for each chain, a tensioning sprocket, a pivoting arm which carries the sprocket, a thrust spring which acts on the arm, and a one-way ratchet mechanism associated with the arm.

3. A device according to claim 1, wherein the stationary unit is fixed to a rear end of the platform.

* * * * *